United States Patent
Oh

(10) Patent No.: US 11,101,564 B2
(45) Date of Patent: Aug. 24, 2021

(54) ELECTRONIC DEVICE INCLUDING ANTENNA STRUCTURE INSTALLABLE IN NARROW SPACE

(71) Applicant: Samsung Electronics Co., Ltd., Suwon-si (KR)

(72) Inventor: Chanhee Oh, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 8 days.

(21) Appl. No.: 16/796,275

(22) Filed: Feb. 20, 2020

(65) Prior Publication Data

US 2020/0411989 A1    Dec. 31, 2020

(30) Foreign Application Priority Data

Jun. 26, 2019  (KR) .......................... 10-2019-0076374

(51) Int. Cl.
*H01Q 7/00* (2006.01)
*H01Q 1/24* (2006.01)
(Continued)

(52) U.S. Cl.
CPC ................ *H01Q 7/00* (2013.01); *H01Q 1/24* (2013.01); *H01Q 1/38* (2013.01); *H01Q 1/243* (2013.01); *H02J 50/12* (2016.02); *H02J 50/90* (2016.02)

(58) Field of Classification Search
CPC .. H01Q 7/00; H01Q 1/24; H01Q 1/38; H01Q 1/243; H02J 50/90; H02J 50/12
See application file for complete search history.

(56) References Cited

U.S. PATENT DOCUMENTS

2015/0035709 A1    2/2015  Lim
2015/0333547 A1    11/2015 Na et al.
(Continued)

FOREIGN PATENT DOCUMENTS

CN          108933330 A      12/2018
KR    10-2015-0131924 A      11/2015
(Continued)

OTHER PUBLICATIONS

International Search Report dated May 29, 2020, issued in International Application No. PCT/KR2020/002523.
(Continued)

*Primary Examiner* — Joseph J Lauture
(74) *Attorney, Agent, or Firm* — Jefferson IP Law, LLP

(57) ABSTRACT

An electronic device that includes an antenna structure installable in a narrow space is provided. The electronic device may include a first support member, a second support member, a printed circuit board (PCB), an antenna, and a first connector. The second support member is disposed in parallel with the first support member such that a lower surface thereof faces the first support member, and combined with the first support member through a plurality of fixing members. The PCB is disposed between the first and second support members and fixed by the plurality of fixing members. The antenna includes a flexible printed circuit board (FPCB), a short range communication antenna pattern formed on the FPCB, and a wireless charging coil formed on the FPCB. The first connector electrically connects the PCB and the antenna by passing through a lateral surface of the second support member such that the antenna covers an upper surface of the second support member and at least one of the plurality of fixing members is overlapped with the wireless charging coil of the antenna.

20 Claims, 15 Drawing Sheets

(51) Int. Cl.
    *H01Q 1/38*     (2006.01)
    *H02J 50/90*     (2016.01)
    *H02J 50/12*     (2016.01)

(56) References Cited

U.S. PATENT DOCUMENTS

2017/0047791 A1\*   2/2017   Jang ........................ H01F 38/14
2019/0067798 A1    2/2019   Hao et al.
2019/0235584 A1    8/2019   Tenno et al.

FOREIGN PATENT DOCUMENTS

KR       10-1792418 B1    10/2017
WO     2018/092569 A1     5/2018

OTHER PUBLICATIONS

Samsung Newsroom Korea, "Samsung Electronics Releases the Galaxy Fold, a Foldable Smartphone", URL: https://news.samsung.com/kr/%ec%82%bc%ec%84%b1%ec%a0%84%ec%9e%90-%ed%%8f%b4%eb%8d%94%eb%b8%94-%ec%8a%a4%eb%a7%88%ed%8a%b8%ed%8f%b0-%ea%b0%a4%eb%9f%ad%ec%8b%9c-%ed%8f%b4%eb%93%9c-%ec%a0%84%ea%b2%a9-%ea%b3%b5, Feb. 21, 2019.

\* cited by examiner

ELECTRONIC DEVICE INCLUDING ANTENNA STRUCTURE INSTALLABLE IN NARROW SPACE

CROSS-REFERENCE TO RELATED APPLICATION(S)

This application is based on and claims priority under 35 U.S.C. § 119(a) of a Korean patent application number 10-2019-0076374, filed on Jun. 26, 2019, in the Korean Intellectual Property Office, the disclosure of which is incorporated by reference herein in its entirety.

BACKGROUND

1. Field

The disclosure relates to an electronic device including an antenna structure installable in a narrow space to perform short range communication or wireless charging.

2. Description of Related Art

With consumer's demands and market trends, electronic devices have been developed in various forms. For example, new electronic devices having a foldable structure or a wearable structure have been introduced. In such electronic devices, constraints in an inner space for installing components of the electronic device may arise.

Normally, an antenna of an electronic device for short range communication or wireless charging has a coil shape. For reliable operations of this antenna, a certain area needs to be secured for the antenna.

Accordingly, in an electronic device in which a plurality of components are mounted to realize various functionalities, an antenna having a structure capable of eliminating spatial constraints for installing a coil-shaped antenna is required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device including an antenna structure that allows a sufficient space for antenna installation within a limited space.

Additional aspects will be set forth in part in the description which follows and, in part, will be apparent from the description, or may be learned by practice of the presented embodiments.

In accordance with an aspect of the disclosure, an electronic device that includes an antenna structure installable in a narrow space is provided. The electronic device may include a first support member, a second support member disposed in parallel with the first support member such that a lower surface thereof faces the first support member, and combined with the first support member through a plurality of fixing members, a printed circuit board (PCB) disposed between the first support member and the second support member and fixed by the plurality of fixing members, an antenna including a flexible printed circuit board (FPCB), a short range communication antenna pattern formed on the FPCB, and a wireless charging coil formed on the FPCB, and a first connector electrically connecting the PCB and the antenna by passing through a lateral surface of the second support member such that the antenna covers an upper surface of the second support member and at least one of the plurality of fixing members is overlapped with the wireless charging coil of the antenna.

In accordance with another aspect of the disclosure, an electronic device that includes an antenna structure installable in a narrow space is provided. The electronic device may include a hinge structure, first and second housing structures connected to each other by the hinge structure to be foldable with respect to each other, a first support member disposed in parallel with the first housing structure such that a lower surface thereof faces the first housing structure, and combined with the first housing structure through a plurality of fixing members, a PCB disposed between the first housing structure and the first support member and fixed by the plurality of fixing members, an antenna including an FPCB, a short range communication antenna pattern formed on the FPCB, and a wireless charging coil formed on the FPCB, and a first connector electrically connecting the first PCB and the antenna by passing through a lateral surface of the first support member such that the antenna covers an upper surface of the first support member and at least one of the plurality of fixing members is overlapped with the wireless charging coil of the antenna.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
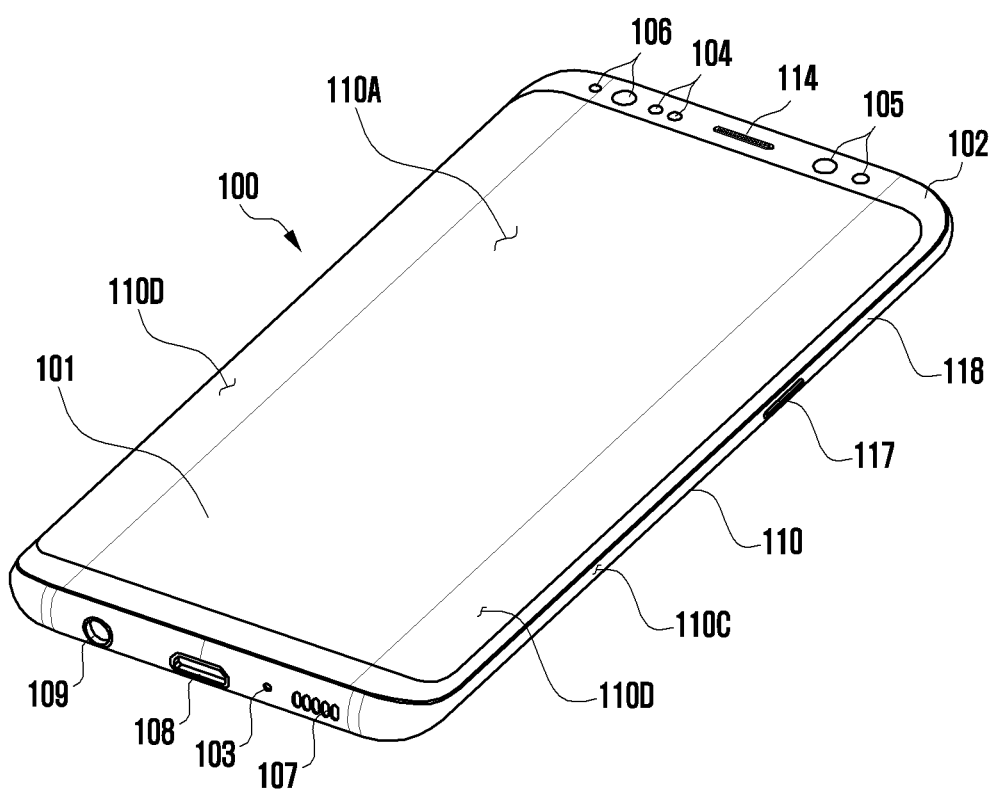
FIG. 1 is a perspective view showing a front surface of an electronic device according to an embodiment of the disclosure.
Figure 2:
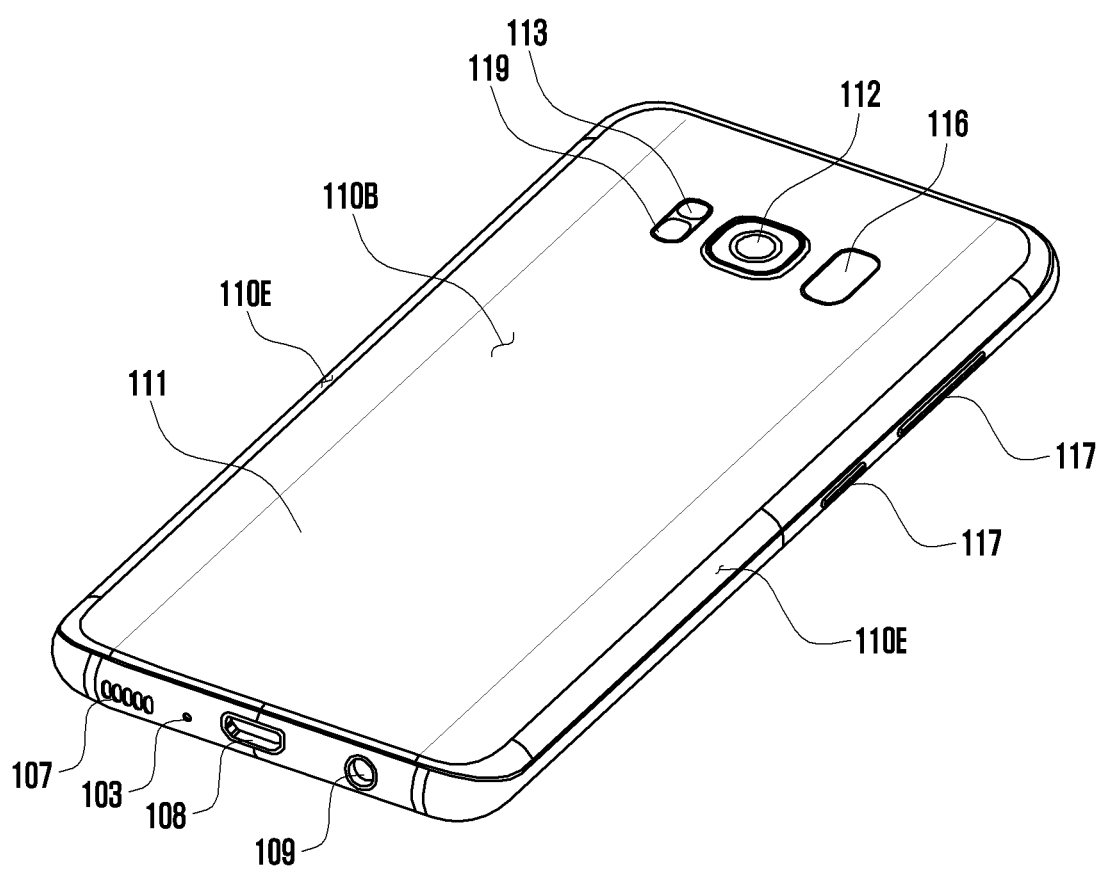
FIG. 2 is a perspective view showing a rear surface of the electronic device shown in FIG. 1 according to an embodiment of the disclosure.
Figure 3:
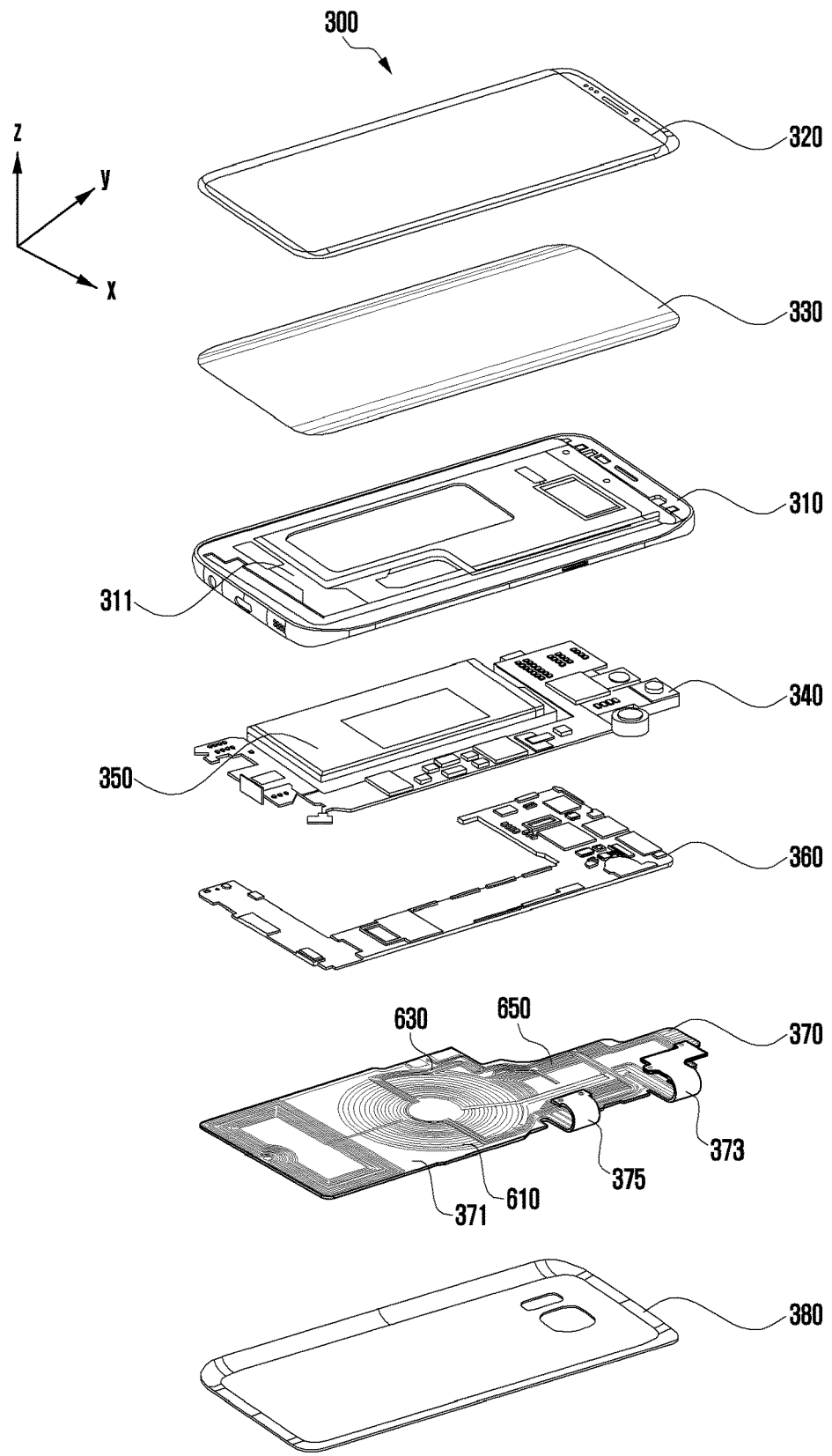
FIG. 3 is an exploded perspective view showing the electronic device shown in FIG. 1 according to an embodiment of the disclosure.

FIG. 1 is a perspective view showing a front surface of an electronic device according to an embodiment of the disclosure. FIG. 2 is a perspective view showing a rear surface of the electronic device shown in FIG. 1 according to an embodiment of the disclosure, and FIG. 3 is an exploded perspective view showing the electronic device shown in FIG. 1 according to an embodiment of the disclosure.

Referring to FIGS. 1 and 2, an electronic device 100 according to an embodiment may include a housing 110 including a first surface (or front surface) 110A, a second surface (or rear surface) 110B, and a side surface 110C surrounding the space between the first surface 110A and the second surface 110B. In another embodiment (not illustrated), the housing may denote a structure that forms a part of the first surface 110A, the second surface 110B, and the side surface 110C illustrated in FIG. 1. According to an embodiment, the first surface 110A may be formed by a front plate 102, at least a part of which is substantially transparent (for example, a glass plate including various coating layers, or a polymer plate). The second surface 110B may be formed by a rear plate 111 that is substantially opaque. The rear plate 111 may be made of coated or colored glass, ceramic, polymer, metal (for example, aluminum, stainless steel (STS), or magnesium), or a combination of at least two of the above-mentioned materials. The side surface 110C may be formed by a side bezel structure (or "side member") 118 which is coupled to the front plate 102 and to the rear plate 111, and which includes metal and/or polymer. In some embodiments, the rear plate 111 and the side bezel structure 118 may be formed integrally and may include the same material (for example, a metal material such as aluminum).

In the illustrated embodiment, the front plate 102 may include two first areas 110D on both ends of the long edge of the front plate 102 such that the two first areas 110D bend from the first surface 110A toward the rear plate 111 and extend seamlessly. In the illustrated embodiment (see FIG. 2), the rear plate 111 may include two second areas 110E on both ends of the long edge such that the two second areas 110E bend from the second surface 110B toward the front plate 102 and extend seamlessly. In some embodiments, the front plate 102 (or the rear plate 111) may include only one of the first areas 110D (or the second areas 110E). In another embodiment, a part of the first areas 110D or the second areas 110E may not be included. In the above embodiments, when seen from the side surface of the electronic device 100, the side bezel structure 118 may have a first thickness (or width) on a part of the side surface, which does not include the first areas 110D or the second areas 110E as described above, and may have a second thickness that is smaller than the first thickness on a part of the side surface, which includes the first areas 110D or the second areas 110E.

According to an embodiment, the electronic device 100 may include at least one of a display 101, audio modules 103, 107, and 114, sensor modules 104, 116, and 119, camera modules 105, 112, and 113, a key input device 117, a light-emitting element 106, and connector holes 108 and 109. In some embodiments, at least one of the constituent elements (for example, the key input device 117 or the light-emitting element 106) of the electronic device 100 may be omitted, or the electronic device 100 may additionally include another constituent element.

The display 101 may be exposed through a corresponding part of the front plate 102, for example. In some embodiments, at least a part of the display 101 may be exposed through the front plate 102 that forms the first areas 110D of the side surface 110C and the first surface 110A. In some embodiments, the display 101 may have a corner formed in substantially the same shape as that of the adjacent outer periphery of the front plate 102. In another embodiment (not illustrated), in order to increase the area of exposure of the display 101, the interval between the outer periphery of the display 101 and the outer periphery of the front plate 102 may be formed to be substantially identical.

In another embodiment (not illustrated), a recess or an opening may be formed in a part of the screen display area of the display 101, and at least one of an audio module 114, a sensor module 104, a camera module 105, and a light-emitting element 106 may be included and aligned with the recess or the opening. In another embodiment (not illustrated), on the back surface of the screen display area of the display 101, at least one of an audio module 114, a sensor module 104, a camera module 105, a fingerprint sensor 116, and a light-emitting element 106 may be included. In another embodiment (not illustrated), the display 101 may be coupled to or arranged adjacent to a touch sensing circuit, a pressure sensor capable of measuring the intensity (pressure) of a touch, and/or a digitizer that detects a magnetic field-type stylus pen. In some embodiments, at least a part of the sensor modules 104 and 119 and/or at least a part of the key input device 117 may be arranged in the first areas 110D and/or the second areas 110E.

The audio modules 103, 107, and 114 may include a microphone hole 103 and speaker holes 107 and 114. A microphone for acquiring an external sound may be arranged in the microphone hole 103, and a plurality of microphones may be arranged therein such that the direction of a sound can be sensed in some embodiments. The speaker holes 107 and 114 may include an outer speaker hole 107 and a speech receiver hole 114. In some embodiments, the speaker holes 107 and 114 and the microphone hole 103 may be implemented as a single hole, or a speaker may be included (for example, a piezoelectric speaker) without the speaker holes 107 and 114.

The sensor modules 104, 116, and 119 may generate an electric signal or a data value corresponding to the internal operating condition of the electronic device 100 or the external environment condition thereof. The sensor modules 104, 116, and 119 may include, for example, a first sensor module 104 (for example, a proximity sensor) arranged on the first surface 110A of the housing 110, and/or a second sensor module (not illustrated) (for example, a fingerprint sensor), and/or a third sensor module 119 (for example, an HRM sensor) arranged on the second surface 110B of the housing 110, and/or a fourth sensor module 116 (for example, a fingerprint sensor). The fingerprint sensor may be arranged not only on the first surface 110A (for example, the display 101) of the housing 110, but also on the second surface 110B thereof. The electronic device 100 may further include a sensor module not illustrated, for example, at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or a luminance sensor 104.

The camera modules 105, 112, and 113 may include a first camera device 105 arranged on the first surface 110A of the electronic device 100, a second camera device 112 arranged on the second surface 110B thereof, and/or a flash 113. The camera devices 105 and 112 may include a single lens or a plurality of lenses, an image sensor, and/or an image signal processor. The flash 113 may include, for example, a light-emitting diode or a xenon lamp. In some embodiments, two or more lenses (an infrared camera, a wide-angle lens, and a telephoto lens) and image sensors may be arranged on a single surface of the electronic device 100.

The key input device 117 may be arranged on the side surface 110C of the housing 110. In another embodiment, the electronic device 100 may not include a part of the above-mentioned key input device 117 or the entire key input device 117, and the key input device 117 (not included) may be implemented in another type, such as a soft key, on the display 101. In some embodiments, the key input device may include a sensor module 116 arranged on the second surface 110B of the housing 110.

The light-emitting element 106 may be arranged on the first surface 110A of the housing 110, for example. The light-emitting element 106 may provide information regarding the condition of the electronic device 100 in a light type, for example. In another embodiment, the light-emitting element 106 may provide a light source that interworks with operation of the camera module 105, for example. The light-emitting element 106 may include, for example, a light emitting diode (LED), an infrared light emitting diode (IR LED), and a xenon lamp.

The connector holes 108 and 109 may include a first connector hole 108 capable of containing a connector (for example, a universal serial bus (USB) connector) for transmitting/receiving power and/or data to/from an external electronic device, and/or a second connector hole (for example, an earphone jack) 109 capable of containing a connector for transmitting/receiving an audio signal to/from the external electronic device.

Referring to FIG. 3, the electronic device 300 may include a side bezel structure 310, a first support member 311 (for example, a bracket), a front plate 320, a display 330, a printed circuit board 340, a battery 350, a second support member 360 (for example, a rear case), an antenna 370, and a rear plate 380. In some embodiments, at least one of the constituent elements (for example, the first support member 311 or the second support member 360) of the electronic device 300 may be omitted, or the electronic device 300 may further include another constituent element. At least one of the constituent elements of the electronic device 300 may be identical or similar to at least one of the constituent elements of the electronic device 100 of FIG. 1 or FIG. 2, and repeated descriptions thereof will be omitted herein.

The first support member 311 may be arranged inside the electronic device 300 and connected to the side bezel structure 310, or may be formed integrally with the side bezel structure 310. The first support member 311 may be made of a metal material and/or a nonmetal (for example, polymer) material, for example. The display 330 may be coupled to one surface of the first support member 311, and the printed circuit board 340 may be coupled to the other surface thereof. A processor, a memory, and/or an interface may be mounted on the printed circuit board 340. The processor may include, for example, one or more of a central processing device, an application processor, a graphic processing device, an image signal processor, a sensor hub processor, or a communication processor.

The memory may include a volatile memory or a non-volatile memory, for example.

The interface may include, for example, a high definition multimedia interface (HDMI), a universal serial bus (USB) interface, a secure digital (SD) card interface, and/or an audio interface. The interface may connect the electronic device 300 with an external electronic device electrically or physically, for example, and may include a USB connector, an SD card/multi-media card (MMC) connector, or an audio connector.

The battery 350 is a device for supplying power to at least one constituent element of the electronic device 300, and may include a non-rechargeable primary cell, a rechargeable secondary cell, or a fuel cell, for example. At least a part of the battery 350 may be arranged on substantially the same plane with the printed circuit board 340, for example. The battery 350 may be arranged integrally inside the electronic device 300, or may be arranged such that the same can be attached to/detached from the electronic device 300.

The antenna 370 may be arranged between the rear plate 380 and the battery 350. The antenna 370 may include, for example, a near field communication (NFC) antenna, a wireless charging antenna, and/or a magnetic secure transmission (MST) antenna. The antenna 370 may conduct near-field communication with an external device or may wirelessly transmit/receive power necessary for charging, for example. In another embodiment, an antenna structure may be formed by a part or a combination of the side bezel structure 310 and/or the first support member 311.

Hereinafter, assembling relationships among the first support member 311, the second support member 360, and the antenna 370 will be described in detail with reference to FIG. 3.

The second support member 360 may be disposed in parallel with the first support member 311 such that a lower surface thereof faces the first support member 311. The second support member 360 may physically protect the PCB 340 interposed between the first and second support members 311 and 360 and may support various components of the electronic device 100.

Figure 10A:
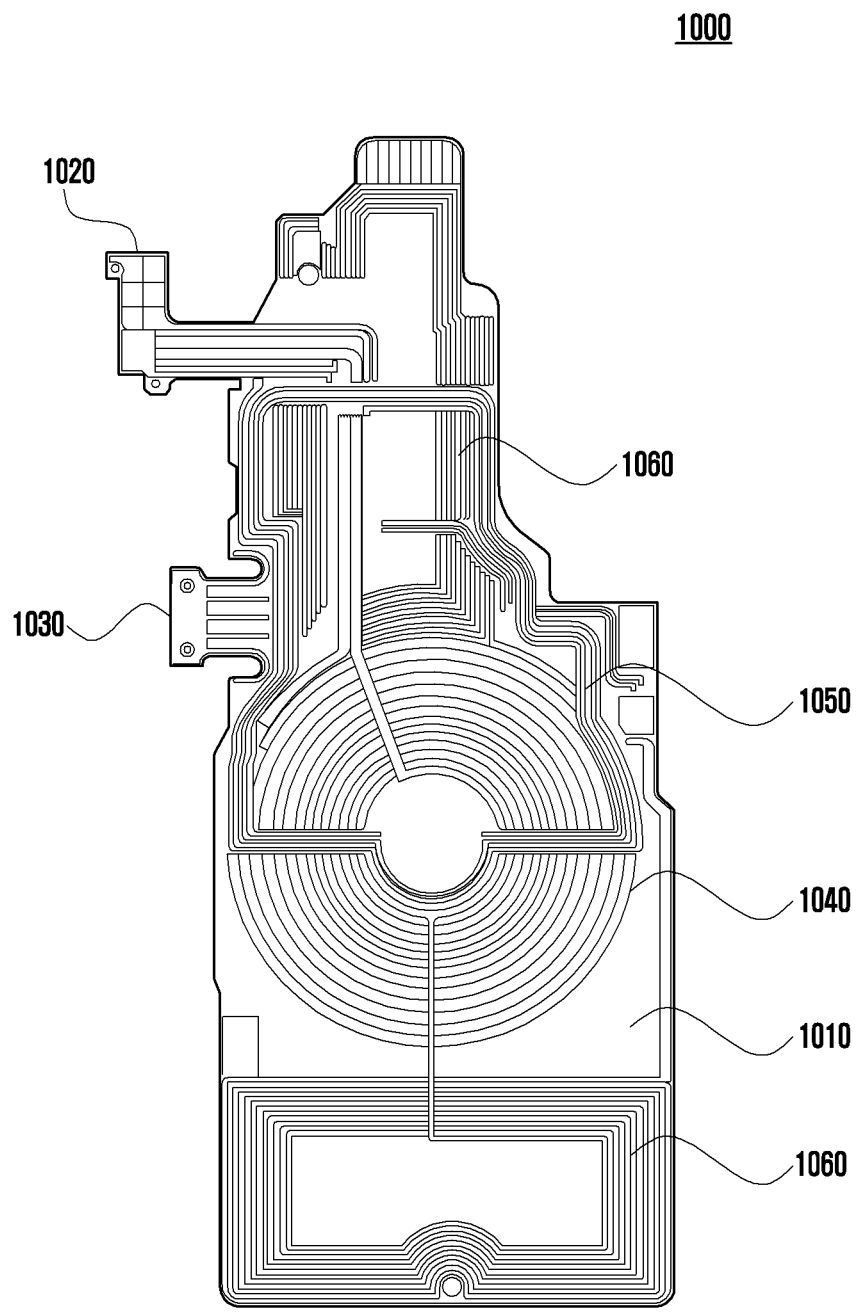
FIG. 10A is a plan view showing the antenna shown in FIG. 9 according to an embodiment of the disclosure.
Figure 10B:
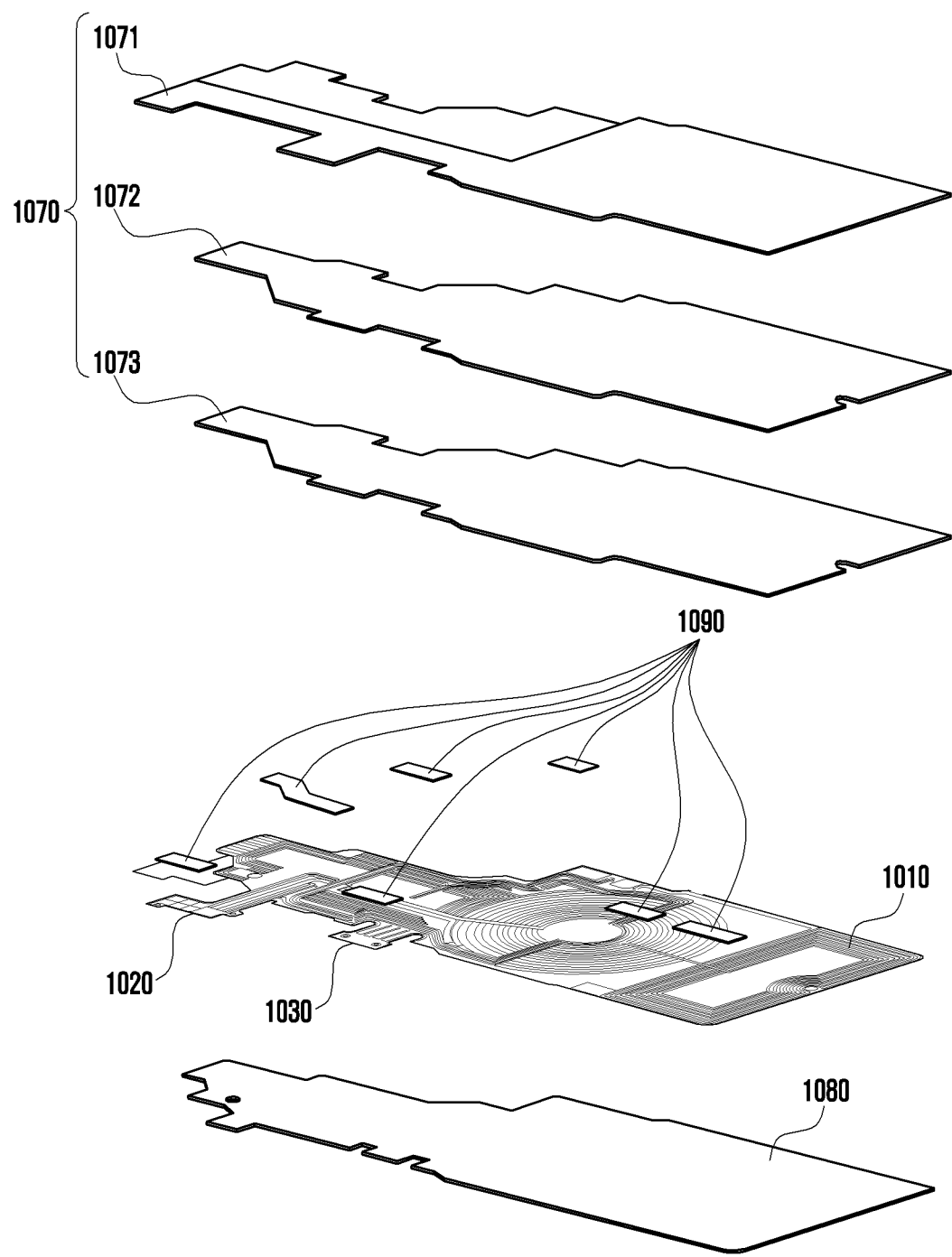
FIG. 10B is an exploded perspective view showing the antenna shown in FIG. 9 according to an embodiment of the disclosure.

The antenna 370 may include a flexible printed circuit board (FPCB) 371 (for example, a flexible printed circuit board 1010 of FIGS. 10A and 10B), a short range communication antenna pattern, and a wireless charging coil 610 (for example, a wireless charging coil 1040 of FIGS. 10A and 10B). The FPCB 371 may be formed of a flexible material. Various components of the antenna 370 may be installed or formed on the FPCB 371. The short range communication antenna pattern may include a near field communication (NFC) antenna 630 (for example, a near field communication antenna 1050 of FIG. 10A) for performing an NFC function and/or a magnetic secure transmission (MST) antenna 650 (for example, a magnetic secure transmission antenna 1060 of FIG. 10A) for performing a magnetic payment function. The wireless charging coil 610 may be configured in a spirally wound pattern. The wireless charging coil 610 may wirelessly receive power from another electronic device or wirelessly transmit power to another electronic device.

A first connector 373 may be formed of a flexible material to be operable even in a bent state. The first connector 373 may electrically connect the antenna 370 to the PCB 340.

Like the first connector 373, a second connector 375 may be formed of a flexible material. The second connector 375 may assist and supplement the first connector 373 such that the antenna 370 can maintain a state of being connected by the first connector 373.

Figure 4A:
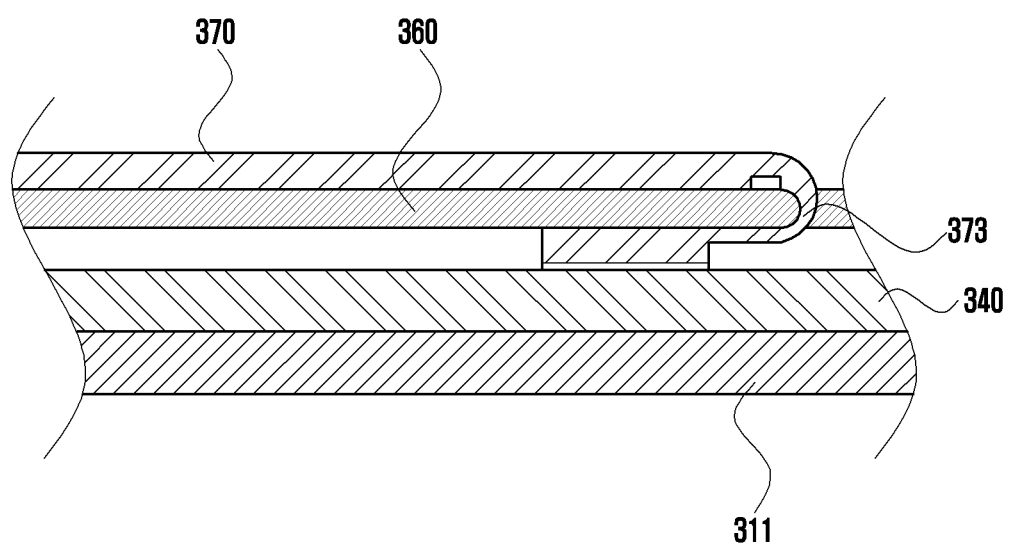
FIGS. 4A, 4B, and 5 are cross-sectional views partially showing the electronic device shown in FIG. 1 according to various embodiments of the disclosure.
Figure 4B:
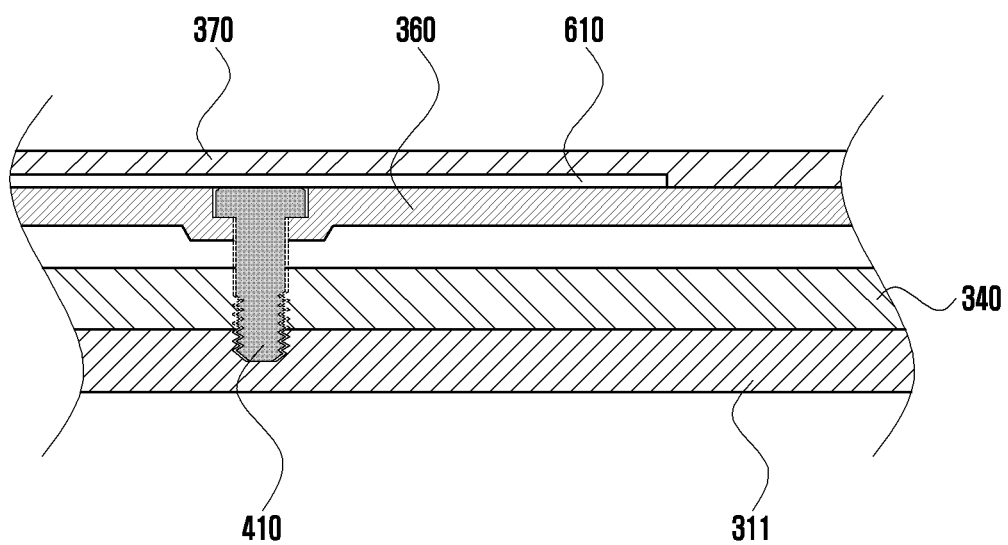
Figure 5:
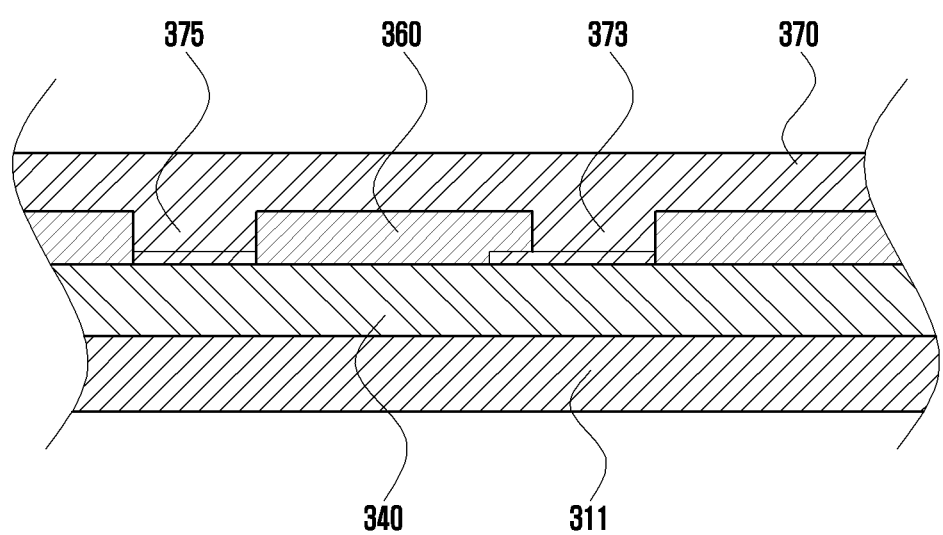

FIGS. 4A, 4B, and 5 are cross-sectional views partially showing the electronic device shown in FIG. 1 according to various embodiments of the disclosure. Specifically, FIGS. 4A and 4B are cross-sectional views taken along the short axis of the first support member 311 according to various embodiments of the disclosure, and FIG. 5 is a cross-sectional view taken along the long axis of the first support member 311 according to an embodiment of the disclosure. In addition, FIG. 4A is a cross-sectional view showing a portion of the first connector 373 according to an embodiment of the disclosure, and FIG. 4B is a cross-sectional view showing a middle portion of the antenna 370 according to an embodiment of the disclosure.

Referring to FIGS. 4A and 5, the first connector 373 may electrically connect the PCB 340 and the antenna 370 while passing through a lateral surface of the second support member 360. As shown in FIG. 4A, the first connector 373 may connect the PCB 340 and the antenna 370 while surrounding the lateral surface of the second support member 360. That is, the first connector 373 may be bent in a U shape as shown in FIG. 4A and connect the PCB 340 and the antenna 370.

In detail, the first connector 373 may be electrically connected to the PCB 340 on a lower surface of the second support member 360 and extended to pass through the lateral surface of the second support member 360. According to an embodiment, the first connector 373 may be electrically connected to the PCB 340 through a connecting member (e.g., a contact 1130 in FIG. 11A). The connecting member may be shaped like C-clip. The first connector 373 extended through the lateral surface of the second support member 360 may be electrically connected to the FPCB of the antenna 370 on an upper surface of the second support member 360. That is, the first connector 373 electrically connects the FPCB of the antenna 370 to the PCB 340 such that internal components of the antenna 370 can operate.

The above structure of the first connector 373 for connecting the antenna 370 to the PCB 340 allows the area of the FPCB for forming the antenna 370 and an installation space of the antenna 370 to be sufficiently secured. In addition, the structure of the first connector 373 passing through the lateral surface of the second support member 360 allows the antenna 370 to be extended to cover the upper surface of the second support member 360 as shown in FIG. 5. That is, the FPCB of the antenna 370 may be extended to a position of entirely covering the second support member 360. As described above, on the FPCB of the antenna 370, the NFC antenna, the MST antenna, and the wireless charging coil may be formed. The electronic device according to an embodiment of the disclosure configures the first connector 373 to utilize the upper surface of the second support member 360, thereby securing a required area of the FPCB of the antenna 370. Accordingly, the electronic device includes an antenna structure installable in a narrow space.

Referring to FIG. 4B, the second support member 360 may be combined with the first support member 311 through a plurality of fixing members 410. Various structures or materials capable of fixing the second support member 360 to the first support member 311 may be used for the fixing member 410. In an illustrated embodiment, a fastening bolt is used as the fixing member 410 to fix the second support member 360 to the first support member 311. That is, a plurality of holes are formed in the second support member 360, and each fastening bolt 410 is inserted into the corresponding hole and then fastened to the first support member 311. As a result, the first and second support members 311 and 360 are combined with each other.

Figure 6:
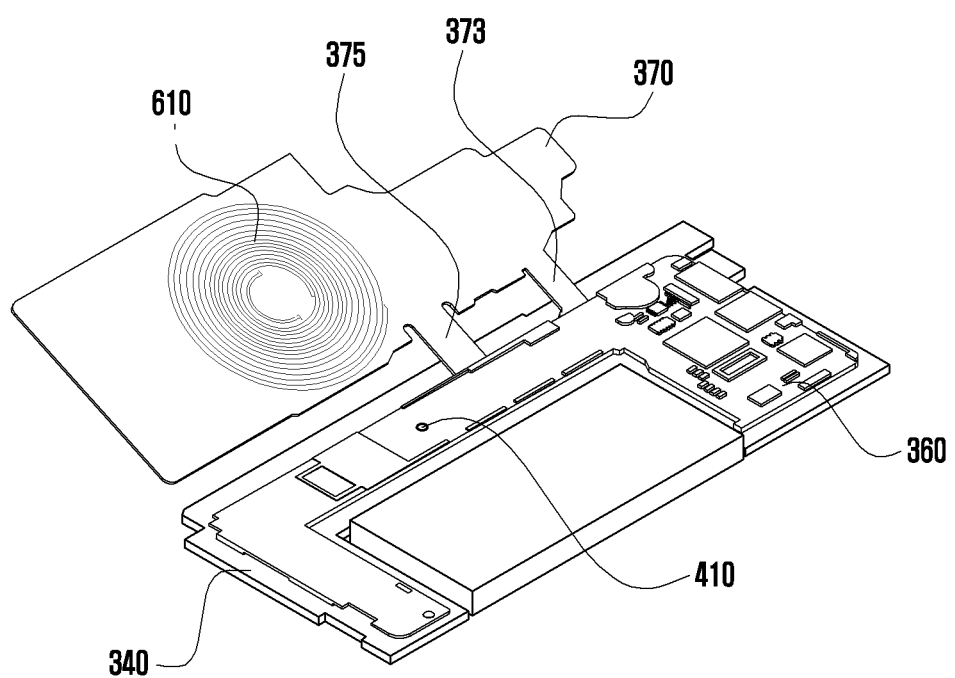
FIG. 6 is a perspective view showing a process of assembling the antenna shown in FIG. 3 according to an embodiment of the disclosure.

FIG. 6 is a perspective view showing a process of assembling the antenna 370 shown in FIG. 3 according to an embodiment of the disclosure.

Referring to FIG. 6, first, when the first connector 373 is in an unfolded state, the first connector 373 is connected to the PCB 340. Next, as shown in FIG. 6, the second support member 360 is disposed on the PCB 340. In this state, the second support member 360 is combined with the first support member 311 through the fixing member 410. After the second support member 360 is fixed to the first support member 311 through the fixing member 410, the first connector 373 is bent such that the fixing member 410 is positioned between the antenna 370 and the second support member 360. As a result, as shown in FIG. 4B, the wireless charging coil 610 of the antenna 370 may be overlapped with the fixing member 410.

Meanwhile, the second connector 375 is formed in the same shape as the first connector 373. That is, the second connector 375 may also be connected to the antenna 370 while being bent in a U shape to surround the lateral surface of the second support member 360. The second connector 375 may assist and supplement the first connector 373 such that the antenna 370 can maintain a state of being connected to the PCB 340 by the first connector 373. The second connector 375 mechanically supports the antenna 370 to prevent the antenna 370 from being unstable. Thus, the connection between the FPCB of the antenna 370 and the PCB 340 may be stably maintained by the second connector 375. One end of the second connector 375 may be connected to the antenna 370, and the other end may be fixed to the second support member 360 or the PCB 340. As shown in FIG. 5, the first connector 373 and the second connector 375 may be formed to pass through the same lateral surface of the second support member 360. In a certain embodiment, the second connector 375 may have a metal pattern embedded therein to prevent the damage of the second connector 375 due to tension or distortion.

Now, an electronic device including an antenna structure installable in a narrow space according to another embodiment of the disclosure will be described with reference to FIGS. 7 to 9. Contrary to the above-discussed electronic device according to an embodiment, the electronic device according to another embodiment to be discussed relates to a case of applying a foldable housing structure.

Figure 7:
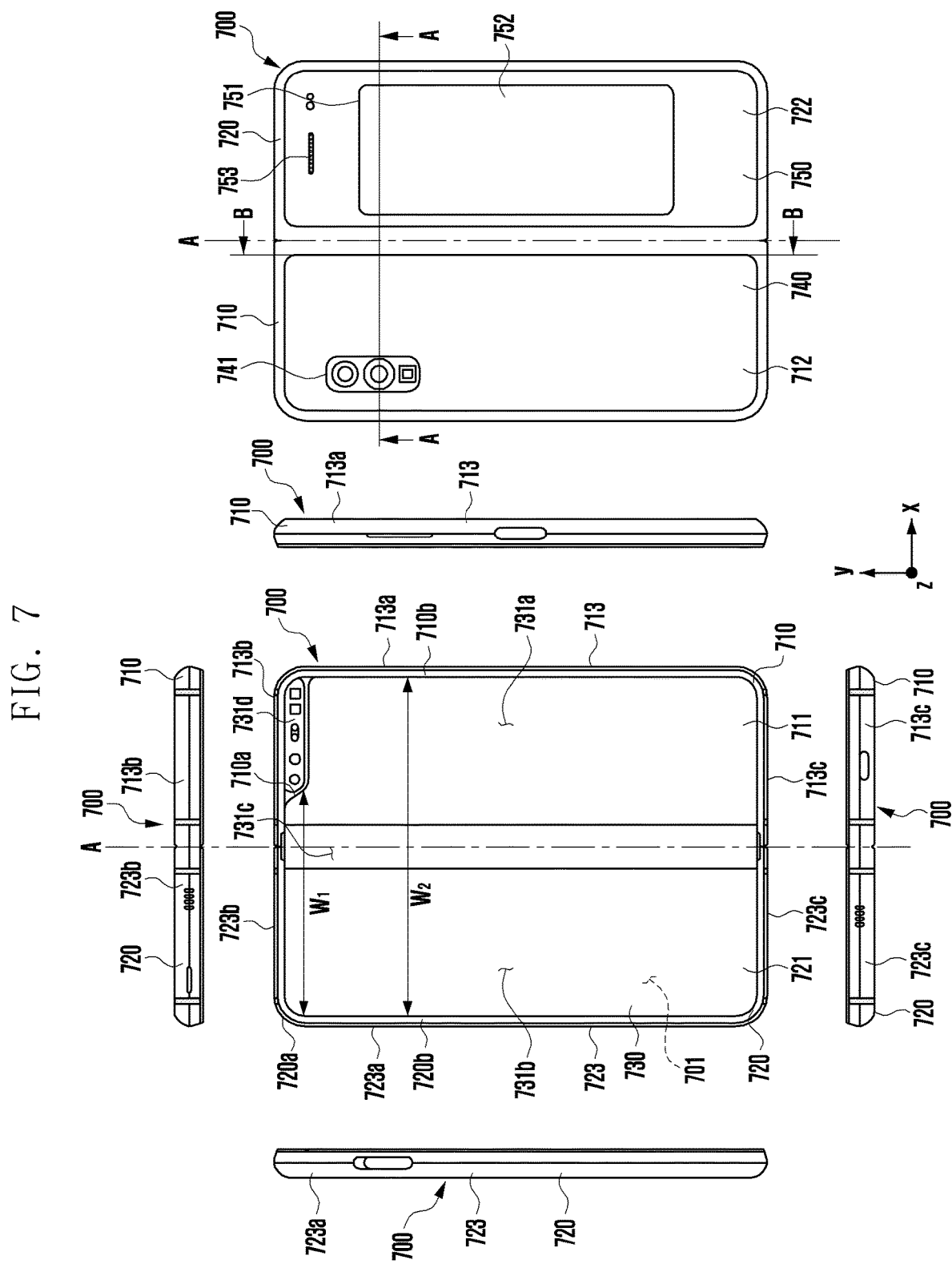
FIG. 7 is a view showing an unfolded state of an electronic device according to another embodiment of the disclosure.
Figure 8:
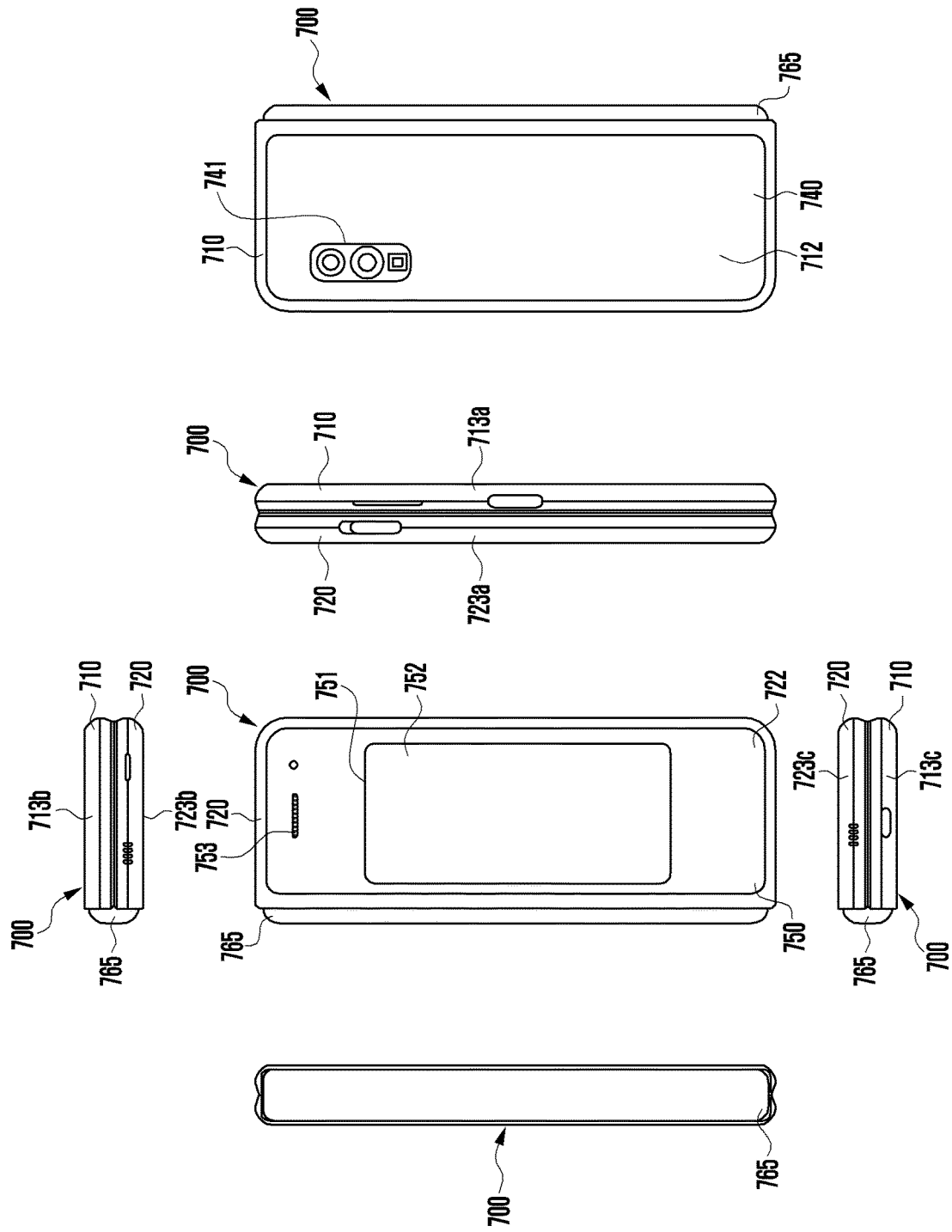
FIG. 8 is a view showing a folded state of the electronic device shown in FIG. 7 according to an embodiment of the disclosure.
Figure 9:
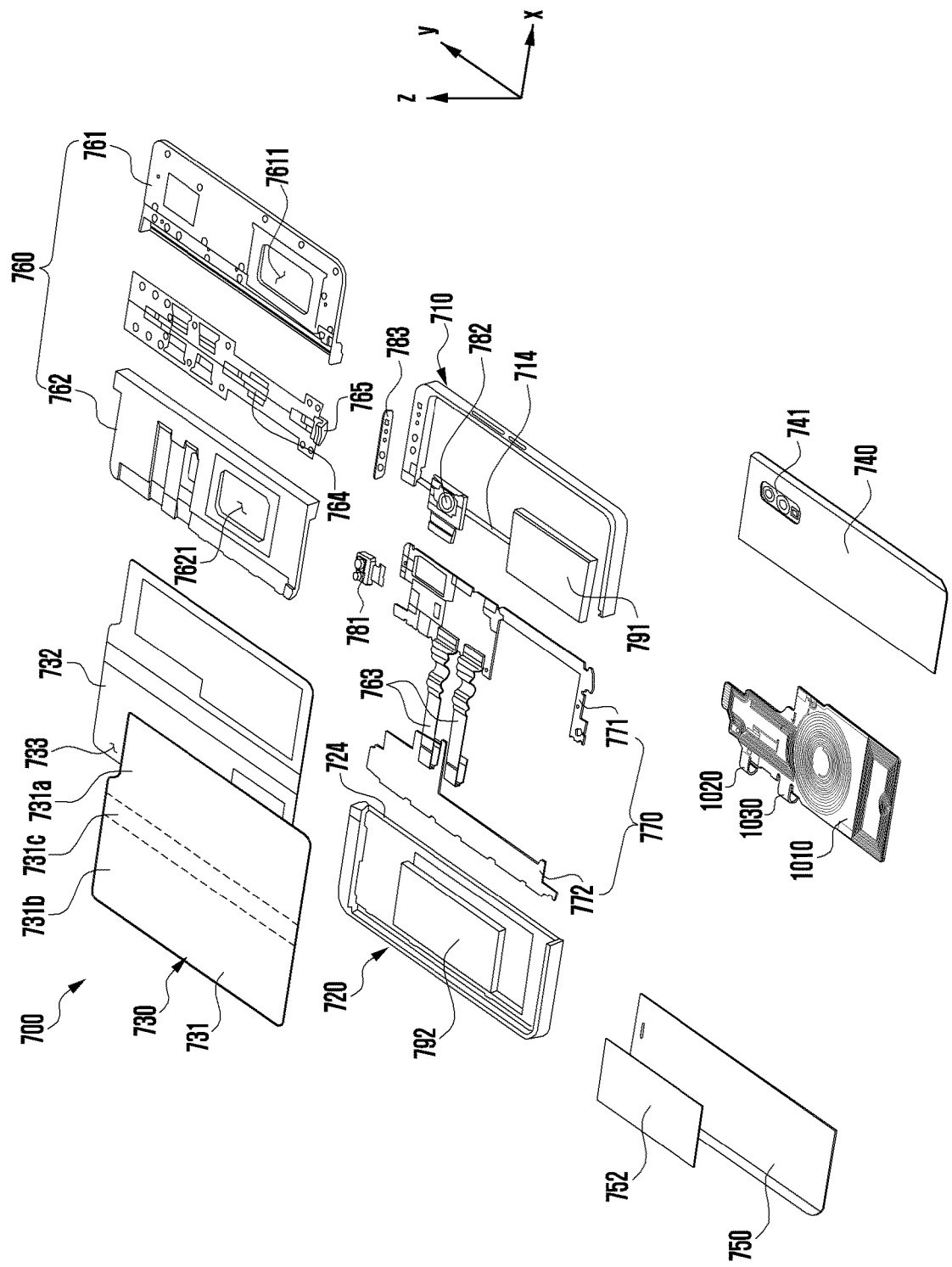
FIG. 9 is an exploded perspective view showing the electronic device shown in FIG. 7 according to an embodiment of the disclosure.

FIG. 7 is a diagram illustrating a flat state of an electronic device 700 according to an embodiment, FIG. 8 is a diagram illustrating a folded state of the electronic device 700, and FIG. 9 is an exploded perspective view illustrating the electronic device 700.

With reference to FIG. 7, the electronic device 700 may include a pair of housing structures 710 and 720 (e.g., foldable housing structure) rotatably coupled through a hinge structure (e.g., a hinge structure 764 of FIG. 9) to be folded to each other, a hinge cover (e.g., a hinge cover 765 of FIG. 8) for covering a foldable portion of the pair of housing structures 710 and 720, and a display unit 730 (e.g., flexible display, foldable display, or first display) disposed in a space formed by the pair of housing structures 710 and 720. In this document, a surface in which the display unit 730 is disposed may be defined as a front surface of the electronic device 700, and an opposite surface of the front surface may be defined as a rear surface of the electronic device 700. Further, a surface enclosing a space between the front surface and the rear surface may be defined as a side surface of the electronic device 700.

In one embodiment, the pair of housing structures 710 and 720 may include a first housing structure 710, a second housing structure 720, a first rear cover 740, and a second rear cover 750 including a sensor area 731d. The pair of housing structures 710 and 720 of the electronic device 700 are not limited to shapes and combinations illustrated in FIGS. 7 and 8, but may be implemented by a combination and/or coupling of other shapes or components. For example, in another embodiment, the first housing structure 710 and the first rear cover 740 may be integrally formed, and the second housing structure 720 and the second rear cover 750 may be integrally formed.

According to one embodiment, the first housing structure 710 and the second housing structure 720 may be disposed at both sides about a folding axis (axis A) and have a shape generally symmetrical with respect to the folding axis (axis A). According to an embodiment, an angle or a distance between the first housing structure 710 and the second housing structure 720 may vary according to whether a state of the electronic device 700 is a flat state or an unfolding state, a folding state, or an intermediate state. According to one embodiment, unlike the second housing structure 720, the first housing structure 710 further includes a sensor area 731d in which various sensors are disposed, but may have a symmetrical shape in other areas. In another embodiment, the sensor area 731d may be further disposed or replaced in at least a partial area of the second housing structure 720.

In one embodiment, the first housing structure 710 may include a first surface 711 connected to a hinge structure (e.g., the hinge structure 764 of FIG. 9) in a flat state of the electronic device 700 and facing in the first direction, a second surface 712 facing in a second direction opposite to the first direction, and a first side member 713 enclosing at least a portion of a space between the first surface 711 and the second surface 712. In one embodiment, the first side member 713 may include a first side surface 713a disposed in parallel to a folding axis (axis A), a second side surface 713b extended in a direction perpendicular to the folding axis from one end of the first side surface 713a, and a third side surface 713c extended in a direction perpendicular to the folding axis (axis A) from the other end of the first side surface 713a.

In an embodiment, the second housing structure 720 may include a third surface 721 connected to a hinge structure (e.g., the hinge structure 764 of FIG. 9) in a flat state of the electronic device 700 and facing in a third direction, a fourth surface 722 facing in a fourth direction opposite to the third direction, and a second surface member 723 enclosing at least a portion of a space between the third surface 721 and the fourth surface 722. In a state in which the pair of housing structures 710 and 720 are folded, the first surface 711 may face the third face 721, and in a state in which the pair of housing structures 710 and 720 are flat, the third direction may be the same as the first direction. In one embodiment, the second surface member 723 may include a fourth side surface 723a disposed parallel to the folding axis (axis A), a fifth side surface 723b extended in a direction perpendicular to the folding axis (axis A) from one end of the fourth side surface 723a, and a sixth side surface 723c extended in a direction perpendicular to the folding axis (axis A) from the other end of the fourth side surface 723a. In one embodiment, the third surface 721 may be disposed to face the first surface 711 in a folded state.

In one embodiment, the electronic device 700 may include a recess 701 formed to receive the display unit 730 through a structural shape combination of the first housing structure 710 and the second housing structure 720. The recess 701 may have substantially the same size as that of the display unit 730. In one embodiment, because of the sensor area 731d, the recess 701 may have two or more different widths in a direction perpendicular to the folding axis (axis A). For example, the recess 701 may have a first width W1 between a first portion 720a parallel to the folding axis (axis A) of the second housing structure 720 and a first portion 710a formed at a periphery of the sensor area 731d of the first housing structure 710 and the second width W2 formed by a second portion 720b of the second housing structure 710 and a second portion 710b parallel to the folding axis (axis A) while not corresponding to the sensor area 731d of the first housing structure 710. In this case, a second width W2 may be formed longer than a first width W1. For example, the recess 701 may be formed to have the first width W1 formed from the first portion 710a of the first housing structure 710 to the first portion 720a of the second housing structure 720 having a mutually asymmetric shape and the second width W2 formed from the second portion 710b of the first housing structure 710 to the second portion 720b of the second housing structure 720 having a mutually symmetrical shape. In one embodiment, the first portion 710a and the second portion 710b of the first housing structure 710 may be formed to have different distances from the folding axis (axis A). A width of the recess 701 is not limited to an illustrated example. In various embodiments, the recess 701 may have two or more different widths by a shape of the sensor area 731d or by a portion having asymmetrical shapes of the first housing structure 710 and the second housing structure 720.

In one embodiment, at least a portion of the first housing structure 710 and the second housing structure 720 may be made of a metallic material or a non-metallic material having rigidity of a selected magnitude so as to support the display unit 730.

In an embodiment, the sensor area 731d may be formed to have a predetermined area adjacent to one corner of the first housing structure 710. However, a disposition, shape, or size of the sensor area 731d is not limited to the illustrated example. For example, in other embodiments, the sensor area 731d may be provided in any area between an upper end corner and a lower end corner or in another corner of the first housing structure 710. In another embodiment, the sensor area 731d may be disposed in at least a partial area of the second housing structure 720. In another embodiment, the sensor area 731d may be disposed to extend to the first housing structure 710 and the second housing structure 720. In an embodiment, the electronic device 700 may be components for performing various functions disposed to be exposed to a front surface of the electronic device 700 through the sensor area 731d or through one or more openings provided in the sensor area 731d. In various embodiments, the components may include, for example, at least one of a front camera device, a receiver, a proximity sensor, an illuminance sensor, an iris recognition sensor, an ultrasonic sensor, or an indicator.

In one embodiment, the first rear cover 740 may be disposed at the second surface 712 of the first housing structure 710 and have a substantially rectangular periphery. In one embodiment, at least a portion of the periphery may be enclosed by the first housing structure 710. Similarly, the second rear cover 750 may be disposed at the fourth surface 722 of the second housing structure 720, and at least a portion of a periphery thereof may be enclosed by the second housing structure 720.

In the illustrated embodiment, the first rear cover 740 and the second rear cover 750 may have a substantially symmetrical shape based on a folding axis (axis A). In another embodiment, the first rear cover 740 and the second rear cover 750 may include various different shapes. In another embodiment, the first rear cover 740 may be integrally formed with the first housing structure 710, and the second rear cover 750 may be integrally formed with the second housing structure 720.

In an embodiment, the first rear cover 740, the second rear cover 750, the first housing structure 710, and the second housing structure 720 may provide a space in which various components (e.g., printed circuit board, antenna module, a sensor module, or a battery of the electronic device 700 may be disposed through a structure coupled to each other. In an embodiment, at the rear surface of the electronic device 700, one or more components may be disposed or visually exposed. For example, one or more components or sensors may be visually exposed through a first rear area 741 of the front rear cover 740. In various embodiments, the sensors may include a proximity sensor, a rear camera device, and/or a flash. In another embodiment, at least a portion of a sub display 752 (e.g., second display) may be visually exposed through a second rear area 751 of the second rear cover 750. In another embodiment, the electronic device 700 may include a speaker module 753 disposed through at least a partial area of the second rear cover 750.

The display unit 730 may be disposed above a space formed by the pair of housing structures 710 and 720. For example, the display unit 730 may be seated in the recess 701 formed by the pair of housing structures 710 and 720 and be disposed to occupy substantially most of the front surface of the electronic device 700. Accordingly, the front surface of the electronic device 700 may include a display unit 730, a partial area (e.g., periphery area) of the first housing structure 710 adjacent to the display unit 730, and a partial area (e.g., periphery area) of the second housing structure 720. In an embodiment, the rear surface of the electronic device 700 may include a first rear cover 740, a partial area (e.g., periphery area) of the first housing structure 710 adjacent to the first rear cover 740, a second rear cover 750, and a partial area (e.g., periphery area) of the second housing structure 720 adjacent to the second rear cover 750.

In one embodiment, the display unit 730 may mean a display in which at least a partial area may be transformed into a flat surface or a curved surface. In one embodiment, the display unit 730 may include a folding area 731c, a first area 731a disposed at one side (e.g., a right area of the folding area 731c) based on the folding area 731c, and a second area 731b disposed at the other side (e.g., a left area of the folding area 731c). For example, the first area 731a may be disposed at the first surface 711 of the first housing structure 710, and the second area 731b may be disposed at the third surface 721 of the second housing structure 720. In an embodiment, area division of the display unit 730 is an example, and the display unit 730 may be divided into a plurality of areas (e.g., four or more or two) according to a structure or a function. For example, in the embodiment illustrated in FIG. 7, an area of the display unit 730 may be divided by the folding axis (axis A) or the folding area 731c extended in parallel to the y axis, but in another embodiment, an area of the display unit 730 may be divided based on another folding area (e.g., a folding area parallel to the x axis) or another folding axis (e.g., a folding axis parallel to the x axis). The aforementioned area division of the display unit 730 is merely a physical division by the pair of housing structures 710 and 720 and a hinge structure (e.g., the hinge structure 764 of FIG. 9), and through substantially the pair of housing structures 710 and 720 and the hinge structure (e.g., the hinge structure 764 of FIG. 9), the display unit 730 may display one full screen. In an embodiment, the first area 731a and the second area 731b may have an entirely symmetrical shape about the folding area 731c. However, unlike the second area 731b, the first area 731a may include a notch area (e.g., the notch area 733 of FIG. 9) cut according to presence of the sensor area 731d, but may have a symmetrical shape with the second area 731b in other areas. For example, the first area 731a and the second area 731b may include portions having symmetrical shapes and portions having asymmetrical shapes.

With reference to FIG. 8, a hinge cover 765 may be disposed between the first housing structure 710 and the second housing structure 720 to be configured to cover internal components (e.g., the hinge structure 764 of FIG. 9). In an embodiment, the hinge cover 765 may be covered or exposed to the outside by a portion of the first housing structure 710 and the second housing structure 720 according to an operating state (flat state or folded state) of the electronic device 700.

For example, as illustrated in FIG. 7, when the electronic device 700 is in a flat state, the hinge cover 765 may be covered so as not to be exposed by the first housing structure 710 and the second housing structure 720. For example, as illustrated in FIG. 8, when the electronic device 700 is in a folded state (e.g., completely folded state), the hinge cover 765 may be exposed to the outside between the first housing structure 710 and the second housing structures 720. For example, when the first housing structure 710 and the second housing structure 720 are in an intermediate state folded with a certain angle, the hinge cover 765 may be at least partially exposed to the outside of the electronic device 700 between the first housing structure 710 and the second housing structure 720. In this case, the exposed area may be smaller than a fully folded state. In one embodiment, the hinge cover 765 may include a curved surface.

Hereinafter, an operation of the first housing structure 710 and the second housing structure 720 according to an operating state (e.g., flat state and folded state) of the electronic device 700 and each area of the display unit 730 are described.

In one embodiment, when the electronic device 700 is in a flat state (e.g., the state of FIG. 7), the first housing structure 710 and the second housing structure 720 may have an angle of 180°, and the first area 731a and the second area 731b of the display unit 730 may be disposed to face the same direction. Further, the folding area 731c may form the same plane as that of the first area 731a and the second area 731b. In another embodiment, when the electronic device 700 is in a flat state, the first housing structure 710 and the second housing structure 720 may be folded opposite so that the second surface 712 and the fourth surface 722 face; thus, the first area 731a and the second area 731b of the display unit 730 may be disposed to face in opposite directions with respect to each other.

In an embodiment, when the electronic device 700 is in a folded state (e.g., the state of FIG. 8), the first housing structure 710 and the second housing structure 720 may be disposed to face each other. The first area 731a and the second area 731b of the display unit 730 may form a narrow angle (e.g., between 0° and 10°) and face each other. At least a portion of the folding area 731c may be formed in a curved surface having a predetermined curvature.

In an embodiment, when the electronic device 700 is in an intermediate state, the first housing structure 710 and the second housing structure 720 may be disposed at a certain angle. The first area 731a and the second area 731b of the display unit 730 may form an angle larger than a folded state and smaller than a flat state. At least a portion of the folding area 731c may be formed in a curved surface having a predetermined curvature, and the curvature in this case may be smaller than that of a folded state.

With reference to FIG. 9, in an embodiment, the electronic device 700 may include a display unit 730, a support member assembly 760, at least one printed circuit board 770, a first housing structure 710, a second housing structure 720, a first rear cover 740, a second rear cover 750, and a flexible printed circuit board (FPCB) 780. In this document, the display unit 730 (e.g., first display) may be referred to as a display module or a display assembly.

The display unit 730 may include a display panel 731 (e.g., flexible display panel) and one or more plates 732 or layers on which the display panel 731 is seated. In one embodiment, the one or more plates 732 may include a conductive plate (e.g., Cu sheet or SUS sheet) disposed between the display panel 731 and the support member assembly 760. According to one embodiment, the conductive plate may be formed to have substantially the same area as that of the display unit, and an area facing a folding area of the display unit may be formed to be bendable. The plate 732 may include at least one subsidiary material layer (e.g., graphite member) disposed at a rear surface of the display panel 731. In one embodiment, the plate 732 may be formed in a shape corresponding to the display panel 731. For example, a partial area of the first plate 732 may be formed in a shape corresponding to the notch area 733 of the display panel 731.

The support member assembly 760 may include a first support member 761 (e.g., first support plate), a second support member 762 (e.g., second support plate), a hinge structure 764 disposed between the first support member 761 and the second support member 762, a hinge cover 765 for covering the hinge structure 764 when viewing from the outside, and at least one wiring member 767 (e.g., flexible printed circuit board (FPCB)) crossing the first support member 761 and the second support member 762.

In one embodiment, the support member assembly 760 may be disposed between the plate 732 and at least one printed circuit board 770. For example, the first support member 761 may be disposed between the first area 731a of the display unit 730 and the first printed circuit board 771. The second support member 762 may be disposed between the second area 731b of the display unit 730 and a second printed circuit board 772.

In an embodiment, at least a portion of the hinge structure 764 and the wiring member 763 may be disposed inside the support member assembly 760. The wiring member 763 may be disposed in a direction (e.g., the x-axis direction) crossing the first support member 761 and the second support member 762. The wiring member 763 may be disposed in a direction (e.g., x-axis direction) perpendicular to a folding axis (e.g., they axis or the folding axis A of FIG. 7) of the folding area 731c.

In one embodiment, as mentioned above, at least one printed circuit board 770 may include a first printed circuit board 771 disposed at the side of the first support member 761 and a second printed circuit board 772 disposed at the side of the second support member 762. The first printed circuit board 771 and the second printed circuit board 772 may be disposed inside a space formed by the support member assembly 760, the first housing structure 710, the second housing structure 720, the first rear cover 740, and the second rear cover 750. In the first printed circuit board 771 and the second printed circuit board 772, components for implementing various functions of the electronic device 700 may be mounted.

In one embodiment, a first space of the first housing structure 710 may include a first printed circuit board 771 disposed in a space formed through the first support member 761, a first battery 791 disposed at a position facing a first swelling hole 7611 of the first support member 761, at least one sensor module 781, or at least one camera module 782. The first housing structure 710 may include a window glass 783 disposed to protect at least one sensor module 781 and at least one camera module 782 at a position corresponding to a notch area 733 of the display unit 730. In an embodiment, a second space of the second housing structure 720 may include a second printed circuit board 772 disposed in a second space formed through the second support member 762 and a second battery 792 disposed at a position facing a second swelling hole 7621 of the second support member 762. According to one embodiment, the first housing structure 710 and the first support member 761 may be integrally formed. According to one embodiment, the second housing structure 720 and the second support member 762 may also be integrally formed. According to an embodiment, the sub display 752 may be disposed in the second space of the second housing structure 720. According to an embodiment, the sub display 752 (e.g., second display) may be disposed to be visible from the outside through at least a partial area of the second rear cover 750.

In one embodiment, the first housing structure 710 may include a first rotational support surface 714, and the second housing structure 720 may include a second rotational support surface 724 corresponding to the first rotational support surface 714. The first rotational support surface 714 and the second rotational support surface 724 may include a curved surface corresponding to a curved surface included in the hinge cover 765.

In an embodiment, when the electronic device 700 is in a flat state (e.g., the state of FIG. 7), the first rotational support surface 714 and the second rotational support surface 724 may cover the hinge cover 765; thus, the hinge cover 765 may not be exposed or minimally exposed to the rear surface of the electronic device 700. In an embodiment, when the electronic device 700 is in a folded state (e.g., the state of FIG. 8), the first rotational support surface 714 and the second rotational support surface 724 may rotate along a curved surface included in the hinge cover 765 to maximally expose the hinge cover 765 to the rear side of the electronic device 700.

Referring to FIG. 9, the first support member 761 may be disposed in parallel with the first housing structure 710 such that a lower surface thereof faces the first housing structure 710. The first support member 761 may physically protect the first PCB 771 interposed between the first housing structure 710 and the first support member 761 and may support various components of the electronic device 700.

Now, an antenna 1000 will be described with reference to FIGS. 10A and 10B. FIG. 10A is a plan view showing the antenna 1000, and FIG. 10B is an exploded perspective view showing the antenna 1000.

The antenna 1000 may include a flexible printed circuit board (FPCB) 1010, a short range communication antenna pattern, and a wireless charging coil 1040. The FPCB 1010 may be formed of a flexible material. Various components of the antenna 1000 may be installed or formed on the FPCB 1010. The short range communication antenna pattern may include a near field communication (NFC) antenna 1050 for performing an NFC function and/or a magnetic secure transmission (MST) antenna 1060 for performing a magnetic payment function. The wireless charging coil 1040 may be configured in a spirally wound pattern. The wireless charging coil 1040 may wirelessly receive power from another electronic device or wirelessly transmit power to another electronic device.

The wireless charging coil 1040 may be formed in a center portion of the FPCB 1010 of the antenna 1000. The MST antenna 1060 may be disposed at both ends of the FPCB 1010 around the wireless charging coil 1040.

A first connector 1020 may be formed of a flexible material to be operable even in a bent state. The first connector 1020 may electrically connect the FPCB 1010 of the antenna 1000 to the first PCB 771.

Like the first connector 1020, a second connector 1030 may be formed of a flexible material. The second connector 1030 may assist and supplement the first connector 1020 such that the antenna 1000 can maintain a state of being connected by the first connector 1020.

Referring to FIG. 10B, the antenna 1000 may include a stack of various films 1070 to protect internal patterns. For example, the stack of films 1070 may include a protective film 1071, a graphite sheet 1072, and a shielding sheet 1073, which are sequentially stacked on the FPCB 1010 having the internal patterns formed thereon. The antenna 1000 disposed in the electronic device 700 may be fixed inside the electronic device 700 through a plurality of adhesive members 1090 formed to occupy some portions of the antenna 1000. An elastic pad 1080 may be attached to one surface of the FPCB 1010. The elastic pad 1080 may be formed of an elastic material such as a sponge to prevent the damage of the internal patterns due to an external impact applied to the antenna 1000.

Figure 11A:
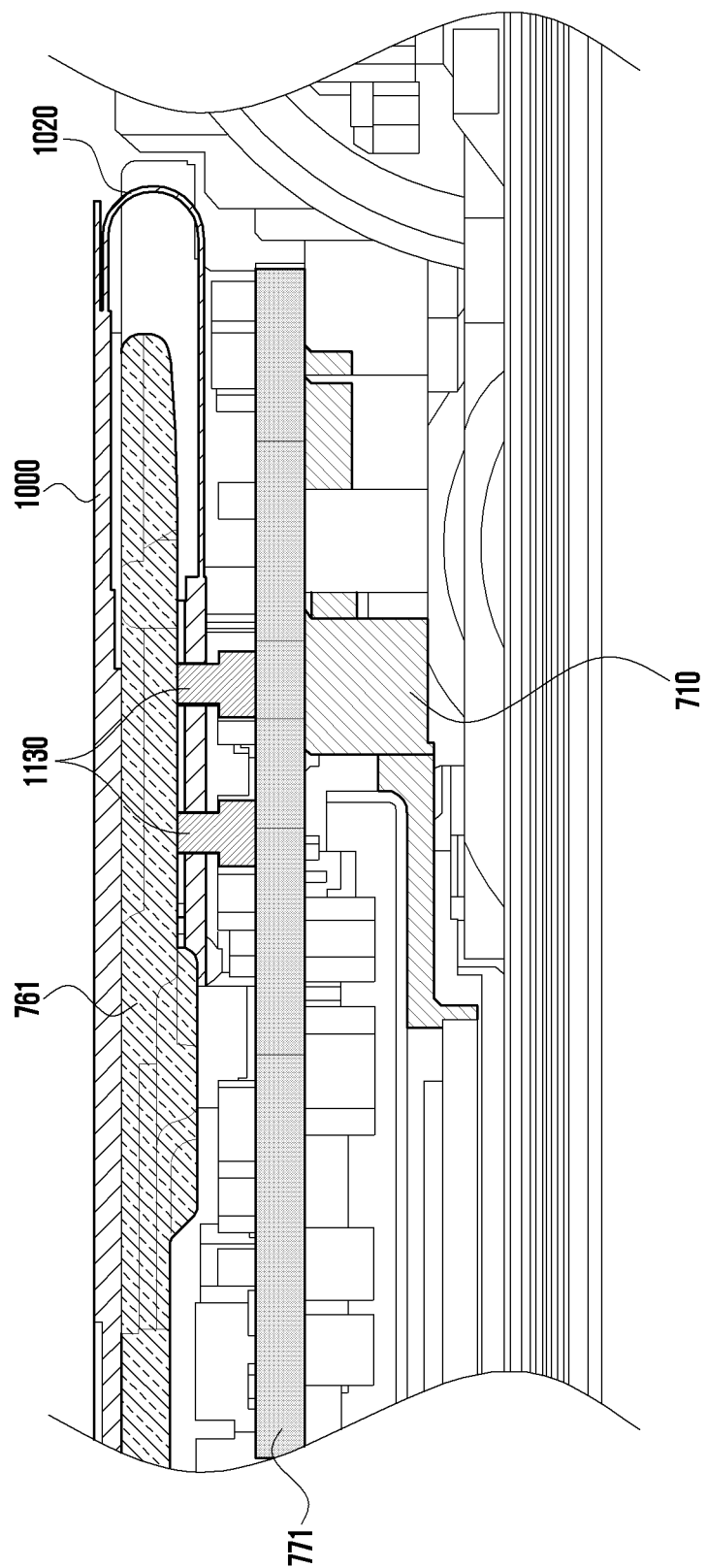
FIG. 11A is a cross-sectional view taken along the line A-A' in FIG. 7 according to an embodiment of the disclosure.
Figure 11B:
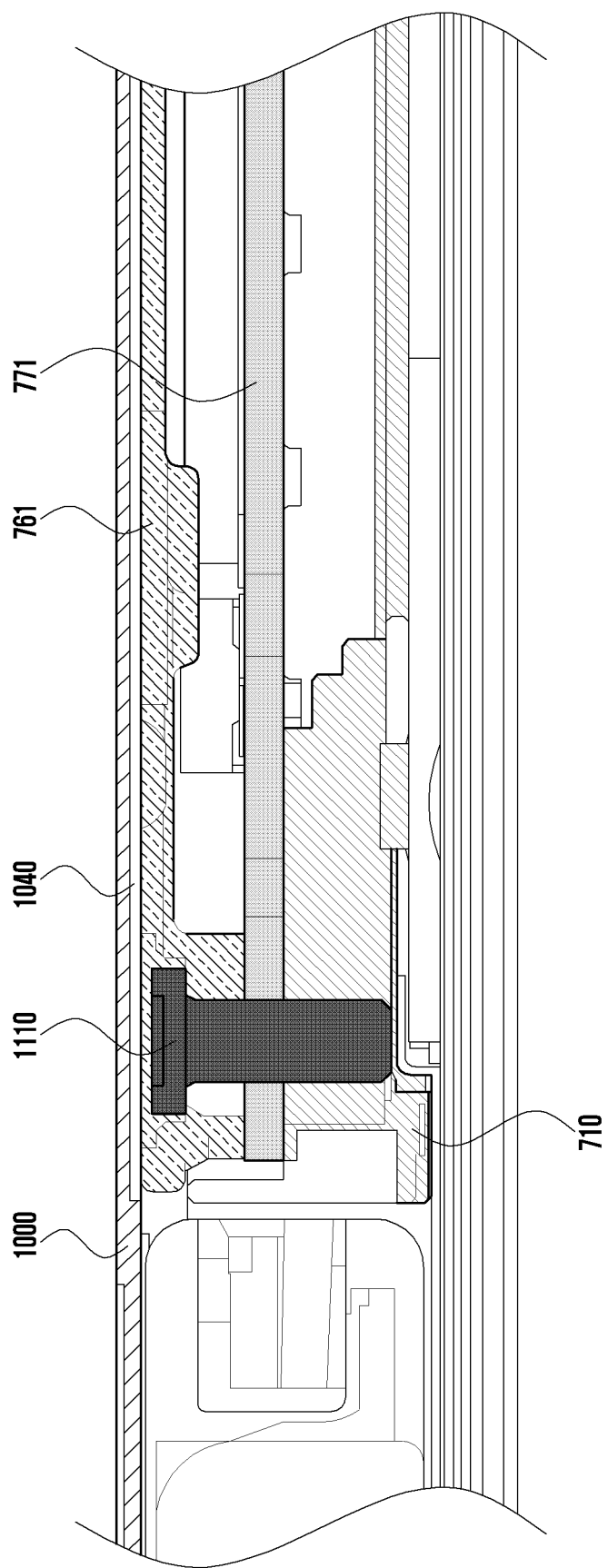
FIG. 11B is a cross-sectional view taken along the line B-B' in FIG. 7 according to an embodiment of the disclosure.

FIGS. 11A and 11B are cross-sectional views partially showing the electronic device of FIG. 7 according to various embodiments of the disclosure. FIG. 11A is a cross-sectional view taken along the line A-A' in FIG. 7 according to an embodiment of the disclosure, and FIG. 11B is a cross-sectional view taken along the line B-B' in FIG. 7 according to an embodiment of the disclosure.

Referring to FIG. 11A, the first connector 1020 may electrically connect the first PCB 771 and the antenna 1000 while passing through a lateral surface of the first support member 761. The first connector 1020 may connect the first PCB 771 and the antenna 1000 while surrounding the lateral surface of the first support member 761 at a position adjacent to the hinge structure 764 of the electronic device 700. That is, the first connector 1020 may be bent in a U shape as shown in FIG. 11A and connect the first PCB 771 and the antenna 1000.

In detail, the first connector 1020 may be electrically connected to the first PCB 771 on a lower surface of the first support member 761 and extended to pass through the lateral surface of the first support member 761. In an embodiment, the first connector 1020 may be electrically connected to the first PCB 771 through a contact 1130. The contact 1130 may be shaped like C-clip. The first connector 1020 extended through the lateral surface of the first support member 761 may be electrically connected to the FPCB 1010 of the antenna 1000 on an upper surface of the first support member 761. That is, the first connector 1020 electrically connects the FPCB 1010 of the antenna 1000 to the first PCB 771 such that internal components of the antenna 1000 can operate.

The above structure of the first connector 1020 for connecting the antenna 1000 to the first PCB 771 allows sufficiently securing the area of the FPCB 1010 for forming the antenna 1000 and an installation space of the antenna 1000. In addition, the structure of the first connector 1020 passing through the lateral surface of the first support member 761 allows the antenna 1000 to be extended to cover the upper surface of the first support member 761 as shown in FIG. 11B. That is, the FPCB 1010 of the antenna 1000 may be extended to a position of entirely covering the first support member 761. As described above, on the FPCB 1010 of the antenna 1000, the NFC antenna 1050, the MST antenna 1060, and the wireless charging coil 1040 may be formed. The electronic device according to an embodiment of the disclosure configures the first connector 1020 to utilize the upper surface of the first support member 761, thereby securing a required area of the FPCB 1010 of the antenna 1000. Accordingly, the electronic device includes an antenna structure installable in a narrow space.

Referring to FIG. 11B, the first support member 761 may be combined with the first housing structure 710 through a plurality of fixing members 1110. Various structures or materials capable of fixing the first support member 761 to the first housing structure 710 may be used for the fixing member 1110. In an illustrated embodiment, a fastening bolt is used as the fixing member 1110 to fix the first support member 761 to the first housing structure 710. That is, a plurality of holes are formed in the first support member 761, and each fastening bolt 1110 is inserted into the corresponding hole and then fastened to the first housing structure 710. As a result, the first support member 761 and the first housing structure 710 are combined with each other.

Figure 12:
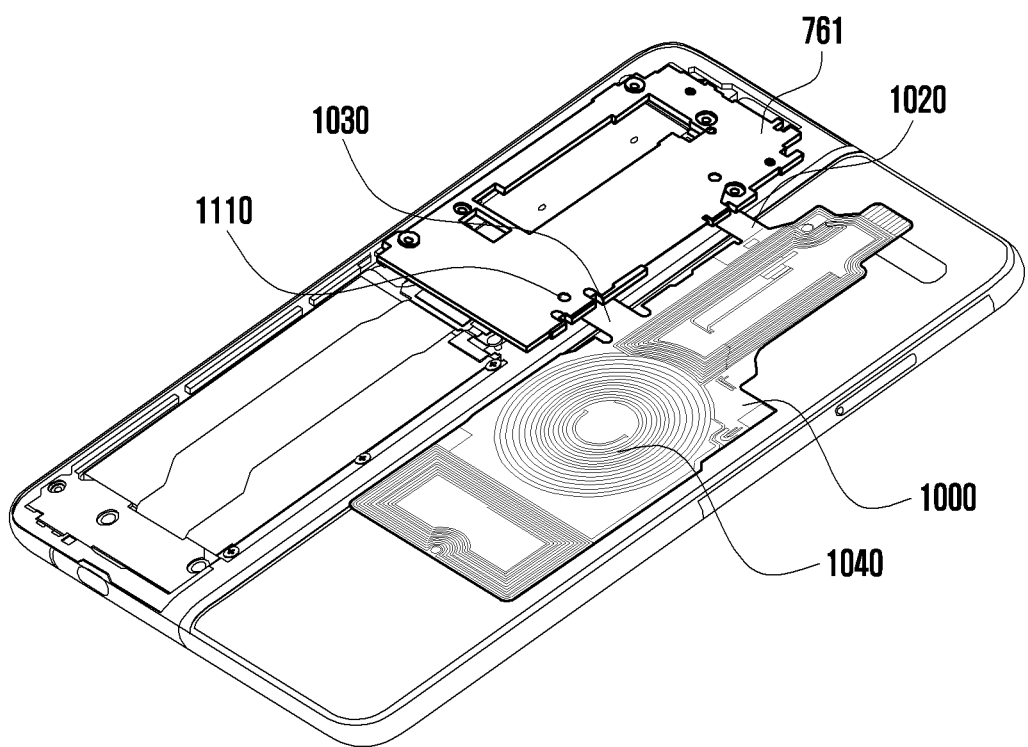
FIG. 12 is a perspective view showing a process of assembling the antenna shown in FIG. 9 according to an embodiment of the disclosure.

FIG. 12 is a perspective view showing a process of assembling the antenna 1000 shown in FIG. 9 according to an embodiment of the disclosure.

Referring to FIG. 12, first, when the first connector 1020 is in an unfolded state, the first connector 1020 is connected to the first PCB 771. Next, as shown in FIG. 9, the first support member 761 is disposed on the first PCB 771. In this state, the first support member 761 is combined with the first housing structure 710 through the fixing member 1110. After the first support member 761 is fixed to the first housing structure 710 through the fixing member 1110, the first connector 1020 is bent such that the fixing member 1110 is positioned between the antenna 1000 and the first support member 761. As a result, as shown in FIG. 11B, the wireless charging coil 1040 of the antenna 1000 may be overlapped with the fixing member 1110.

Meanwhile, the second connector 1030 is formed in the same shape as the first connector 1020. That is, the second connector 1030 may also be connected to the antenna 1000 while being bent in a U shape to surround the lateral surface of the first support member 761. The second connector 1030 may assist and supplement the first connector 1020 such that the antenna 1000 can maintain a state of being connected to the first PCB 771 by the first connector 1020. The second connector 1030 mechanically supports the antenna 1000 to prevent the antenna 1000 from being unstable. Thus, the connection between the FPCB 1010 of the antenna 1000 and the first PCB 771 may be stably maintained by the second connector 1030. One end of the second connector 1030 may be connected to the antenna 1000, and the other end may be fixed to the first support member 761 or the first PCB 771. As shown in FIG. 12, the first connector 1020 and the second connector 1030 may be formed to pass through the same lateral surface of the first support member 761. In a certain embodiment, the second connector 1030 may have a metal pattern embedded therein to prevent the damage of the second connector 1030 due to tension or distortion.

According to various embodiments of the disclosure, it is possible to efficiently install an antenna for performing short range communication or wireless charging function in a narrow space of an electronic device.

In addition, the antenna can be extended to a space that has been difficult to utilize previously. Therefore, there is an advantage in that the electronic device and the antenna can be designed to realize optimal performance of the antenna installed in a narrow space.

Further, the electronic device can be easily assembled because it is possible to easily access components hidden by the antenna in the assembly process of the electronic device.

In addition to the above-described embodiments in which the antenna structure of the disclosure is applied to the electronic device having a bar-type housing or a foldable housing, any other embodiment in which the antenna structure of the disclosure is applied to an electronic device having various types of housing is also possible. For example, the antenna structure of the disclosure may also be applied to a wearable electronic device.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device including an antenna structure installable in a narrow space, the electronic device comprising:
   a first support member;
   a second support member disposed in parallel with the first support member such that a lower surface thereof faces the first support member, and combined with the first support member through a plurality of fixing members;
   a printed circuit board (PCB) disposed between the first support member and the second support member and fixed by the plurality of fixing members;
   an antenna including a flexible printed circuit board (FPCB), a short range communication antenna pattern formed on the FPCB, and a wireless charging coil formed on the FPCB; and
   a first connector electrically connecting the PCB and the antenna by passing through a lateral surface of the second support member such that the antenna covers an upper surface of the second support member and at least one of the plurality of fixing members is overlapped with the wireless charging coil of the antenna.

2. The electronic device of claim 1, wherein the first connector is electrically connected to the PCB on the lower surface of the second support member, extended in a bent state to surround the lateral surface of the second support member, and electrically connected to the antenna on the upper surface of the second support member.

3. The electronic device of claim 1, wherein the short range communication antenna pattern of the antenna includes at least one of a near field communication (NFC) antenna for enabling the electronic device to perform an NFC function, or a magnetic secure transmission (MST) antenna for enabling the electronic device to perform a magnetic payment function.

4. The electronic device of claim 3,
   wherein the wireless charging coil is formed in a center portion of the FPCB, and
   wherein the MST antenna is disposed at opposite ends of the FPCB around the wireless charging coil.

5. The electronic device of claim 1, further comprising:
   a second connector having one end attached to the lower surface of the second support member, passing through the lateral surface of the second support member, and having another end connected to the antenna.

6. The electronic device of claim 5, wherein the first connector and the second connector are formed to pass through a same lateral surface of the second support member.

7. The electronic device of claim 1, further comprising:
   a second connector having one end connected to the PCB, passing through the lateral surface of the second support member, and having another end connected to the antenna.

8. The electronic device of claim 7, wherein the first connector and the second connector are formed to pass through the lateral surface of the second support member.

9. The electronic device of claim 1, wherein each of the plurality of fixing members is a fastening bolt inserted into a corresponding hole formed in the second supporting member and fixed to the first supporting member.

10. The electronic device of claim 1, further comprising:
    a display,
    wherein the first support member is disposed between the display and the PCB.

11. An electronic device including an antenna structure installable in a narrow space, the electronic device comprising:
    a hinge structure;
    first and second housing structures connected to each other by the hinge structure to be foldable with respect to each other;

a first support member disposed in parallel with the first housing structure such that a lower surface thereof faces the first housing structure, and combined with the first housing structure through a plurality of fixing members;
a first printed circuit board (PCB) disposed between the first housing structure and the first support member and fixed by the plurality of fixing members;
an antenna including a flexible printed circuit board (FPCB), a short range communication antenna pattern formed on the FPCB, and a wireless charging coil formed on the FPCB; and
a first connector electrically connecting the first PCB and the antenna by passing through a lateral surface of the first support member such that the antenna covers an upper surface of the first support member and at least one of the plurality of fixing members is overlapped with the wireless charging coil of the antenna.

12. The electronic device of claim 11, wherein the first connector is electrically connected to the first PCB on the lower surface of the first support member, extended in a bent state to surround the lateral surface of the first support member, and electrically connected to the antenna on the upper surface of the first support member.

13. The electronic device of claim 11, wherein the short range communication antenna pattern of the antenna includes at least one of a near field communication (NFC) antenna for enabling the electronic device to perform an NFC function, or a magnetic secure transmission (MST) antenna for enabling the electronic device to perform a magnetic payment function.

14. The electronic device of claim 13,
wherein the wireless charging coil is formed in a center portion of the FPCB, and
wherein the MST antenna is disposed at opposite ends of the FPCB around the wireless charging coil.

15. The electronic device of claim 11, further comprising:
a second connector having one end attached to the lower surface of the first support member, passing through the lateral surface of the first support member, and having another end connected to the antenna.

16. The electronic device of claim 15, wherein the first connector and the second connector are formed to pass through a same lateral surface of the first support member.

17. The electronic device of claim 11, further comprising:
a second connector having one end connected to the first PCB, passing through the lateral surface of the first support member, and having another end connected to the antenna.

18. The electronic device of claim 17, wherein the first connector and the second connector are formed to pass through a same lateral surface of the first support member.

19. The electronic device of claim 11, wherein each of the plurality of fixing members is a fastening bolt inserted into a corresponding hole formed in the first supporting member and fixed to the first housing structure.

20. The electronic device of claim 11, further comprising:
a display,
wherein the first support member is disposed between the display and the PCB.

* * * * *